(12) United States Patent
Thor et al.

(10) Patent No.: US 11,345,405 B2
(45) Date of Patent: May 31, 2022

(54) MOTOR VEHICLE CHASSIS, COMPRISING MEANS FOR DISTRIBUTING AGAINST A TUNNEL A FORCE APPLIED BY A CROSSMEMBER IN THE EVENT OF A SIDE IMPACT

(71) Applicant: PSA AUTOMOBILES SA, Poissy (FR)

(72) Inventors: Tou Thor, Pont de Roide Vermondans (FR); Stéphane Fonfrede, Belfort (FR)

(73) Assignee: PSA AUTOMOBILES SA, Poissy (FR)

( * ) Notice: Subject to any disclaimer, the term of this patent is extended or adjusted under 35 U.S.C. 154(b) by 78 days.

(21) Appl. No.: 15/734,485

(22) PCT Filed: Jun. 17, 2019

(86) PCT No.: PCT/FR2019/051467
§ 371 (c)(1),
(2) Date: Dec. 2, 2020

(87) PCT Pub. No.: WO2019/243723
PCT Pub. Date: Dec. 26, 2019

(65) Prior Publication Data
US 2021/0229746 A1  Jul. 29, 2021

(30) Foreign Application Priority Data

Jun. 19, 2018  (FR) ...................................... 1855376

(51) Int. Cl.
*B60J 7/00*   (2006.01)
*B62D 21/15*  (2006.01)
*B62D 25/20*  (2006.01)

(52) U.S. Cl.
CPC ........... *B62D 21/157* (2013.01); *B62D 25/20* (2013.01)

(58) Field of Classification Search
CPC ................ B62D 21/02; B62D 25/145; B60G 2200/142; B60G 3/06; B60G 7/02; B60G 2202/312; B60G 2204/128; B64D 15/166
See application file for complete search history.

(56) References Cited

U.S. PATENT DOCUMENTS

| | | | | |
|---|---|---|---|---|
| 4,765,647 A | * | 8/1988 | Kondo | .................... F16F 1/387 |
| | | | | 280/124.144 |
| 8,424,913 B1 | * | 4/2013 | Schunke | ................ B62D 21/02 |
| | | | | 280/800 |

(Continued)

FOREIGN PATENT DOCUMENTS

| | | |
|---|---|---|
| DE | 196 27 610 A1 | 1/1998 |
| DE | 10 2014 006 718 A1 | 11/2015 |

(Continued)

OTHER PUBLICATIONS

International Search Report for PCT/FR2019/051467 dated Oct. 14, 2019.
Written Opinion for PCT/FR2019/051467 dated Oct. 14, 2019.

*Primary Examiner* — Kiran B Patel
(74) *Attorney, Agent, or Firm* — Sandberg Phoenix & von Gontard, P.C.

(57) ABSTRACT

The invention relates to a motor vehicle chassis (3), comprising an underbody frame covered by a floor (7) secured to the frame. The frame comprises side rails (4) and at least one longitudinal tube (5) placed at a transverse distance from one such rail (4) to which the tube (5) is connected via a crossmember (6) which is secured by one of the ends (6a) thereof to the tube (5) and by the other end (6b) thereof to the rail (4). The crossmember (6) forms a first member for transmitting to the tube (5) a first thrust force (EP1) generated by an impact applied laterally against the chassis (3). A strut (8) is jointly secured by the respective ends (8a, 8b) thereof to the crossmember (6) and to the tube (5), and is (Continued)

inclined with respect to the main direction in which they extend in a plane parallel to the floor (7). The strut (8) forms a second member for transmitting to the tube (5) a second thrust force (EP2) generated by said impact and transmitted to the strut (8) by the crossmember (6).

10 Claims, 2 Drawing Sheets

(56) References Cited

U.S. PATENT DOCUMENTS

| | | | | |
|---|---|---|---|---|
| 8,602,454 | B1* | 12/2013 | Baccouche | B60K 1/04 |
| | | | | 180/68.5 |
| 2006/0055162 | A1* | 3/2006 | Beckmann | B62D 21/11 |
| | | | | 280/124.109 |
| 2016/0297273 | A1* | 10/2016 | Hinz | B60G 11/27 |
| 2020/0231216 | A1* | 7/2020 | Choi | B62D 21/155 |
| 2021/0276623 | A1* | 9/2021 | Gordon | B62D 25/20 |

FOREIGN PATENT DOCUMENTS

| | | |
|---|---|---|
| FR | 3023251 A1 | 8/2016 |
| GB | 2490392 A | 10/2012 |

\* cited by examiner

MOTOR VEHICLE CHASSIS, COMPRISING MEANS FOR DISTRIBUTING AGAINST A TUNNEL A FORCE APPLIED BY A CROSSMEMBER IN THE EVENT OF A SIDE IMPACT

CROSS-REFERENCE TO RELATED APPLICATIONS

This application is the US National Stage under 35 USC § 371 of International Application No. PCT/FR2019/051467, filed 17 Jun. 2019 which claims priority to French Application No. 1855376 filed 19 Jun. 2018, both of which are incorporated herein by reference.

BACKGROUND

The present invention relates to the field of motor vehicle chassis and more particularly to the modalities of the deformation thereof under the effect of a side impact to which such a chassis is potentially subjected. The invention relates more specifically to an arrangement of the junction between a crossmember and a tube of the chassis, making it possible to limit the deformation of the chassis when it is subjected to a side impact.

Motor vehicles conventionally comprise a rolling chassis which forms an underbody frame of the vehicle covered by a floor for the movement of passengers inside the passenger compartment of the vehicle. The frame is comprised essentially of rails braced by crossmembers, including side rails, and commonly comprises at least one longitudinal tube which is interposed at a transverse distance between the side rails. Such a tube is then potentially connected to at least one of the side rails via at least one crossmember, such as in particular at least one seat crossmember supporting at least one seat for the passengers of the vehicle.

In this context, the chassis includes arrangements to protect the passengers in the event of a side impact to which the vehicle may be subjected. Such arrangements are essentially aimed at controlling the modalities of deformation of the bodywork elements making up the chassis, in order to limit its deformation and that of the floor when the chassis withstands the impact.

In the context of the invention, a deformation of the tube is more specifically considered in the event of a side impact borne by the chassis, in particular when the vehicle suffers an accident against an obstacle to its progression, which strikes one of the side rails at a junction zone of the side rail with a crossmember connected to the tube.

In the event of a side impact applied against the chassis, the impact generates a thrust force against the end of the crossmember secured to the side rail. The thrust force is then transmitted to the tube via the crossmember, which induces a significant risk of deterioration of the tube and therefore of the floor, and consequently a risk of endangering the safety of the passengers.

It is a known practice to shape the crossmember so that it matches the profile of the tube. See, for example, French Patent FR3023251 (PEUGEOT CITROEN AUTOMOBILES). In the event of an impact, the floor is reinforced and localized breakage of the crossmember is favored. This makes it possible to prevent damage to the tube and an intrusion of the crossmember towards the vehicle interior.

SUMMARY

In this context, a motor vehicle chassis comprises an underbody frame covered by a floor secured to the frame. The underbody frame comprises at least one crossmember extending transversely between a side rail and a longitudinal tube.

The objective is to improve the safety of the vehicle in the event of a side impact applied against the chassis in order to protect the passengers.

Briefly, the design of the chassis specifically aims to limit a degradation of the tube, in particular as regards its maintenance in terms of shape and/or its securing to the floor, so as ultimately to preserve the floor from a deformation which could harm passenger safety.

The design of the chassis takes into account various constraints liable to render a potential solution unacceptable. Such constraints typically include at least the following constraints:

a limitation of an increase in the mass of the vehicle, and/or a limitation of the cost of obtaining the vehicle in the context of notoriously severe economic competition in the automotive sector. In particular, a solution is targeted which is structurally simple and/or which avoids complicating the methods of assembly and/or mounting on the chassis of the members that it uses.

These goals are achieved by applying the following provisions.

If necessary, certain relative concepts and/or terms which are commonly accepted in the automotive field to describe a vehicle, as well as the chassis that it comprises and/or its components, are specified.

The directions of extension of a vehicle are commonly defined in an orthonormal coordinate system identified in a longitudinal direction, a transverse direction and a vertical direction. As used herein, such directions and the related relative concepts are applied to the chassis and/or to its components considered individually or relative to each other, unless otherwise specified.

The concept of longitudinal is considered between the front and the rear of the vehicle with respect to the driver's station, which faces the direction of forward movement of the vehicle. The terms "rail" and "tube" designate bodywork elements extending mainly longitudinally, a tube extending at a transverse distance interposed between rails.

The concept of transverse is typically considered to be along a direction in which the vehicle extends between the right and left lateral sides thereof considered relative to the driver's station in the driving position of the vehicle. The term "crossmember" typically denotes a bodywork element extending mainly transversely.

The concept of vertical is considered to be along a direction in elevation of the vehicle relative to its rolling plane on the ground. Consequently, the concepts of lower and upper, or other related concepts such as under and/or below as well as on and/or above, for example, are relative concepts considered with regard to the concept of verticality with respect to the running plane of the chassis on the ground.

By way of non-limiting example, to assess the technical results obtained by the chassis, a side impact is taken into account that is applied against the chassis by an obstacle to the progression of the vehicle in a junction zone between the crossmember and the side rail of the chassis. In particular, a relative orientation is considered between the longitudinal direction in which the chassis extends and the direction in which the impact is applied against the chassis which is between approximately 70° and 80°, and an amplitude of the side impact which is applied against the chassis taking into account a progression of the vehicle of between approximately 30 km/h (~19 mph) and 35 km/h (~22 mph).

A motor vehicle chassis comprises an underbody frame covered by a floor secured to the frame. The frame comprises side rails and at least one longitudinal tube placed at a transverse distance from one rail to which the tube is connected via a crossmember secured at one of its ends to the tube and at the other of its ends to the rail. The crossmember forms a first member for transmitting to the tube a first thrust force generated by an impact applied laterally against the chassis, in particular in the junction zone between the crossmember and the side rail.

In this context, the chassis is distinctive in that at least one strut is jointly secured at its respective ends to the crossmember and to the tube, and is inclined with respect to the main direction in which the crossmember and tube extend in a plane parallel to the floor. The strut forms a second member for transmitting to the tube a second thrust force generated by the impact and transmitted to the strut by the crossmember.

It is understood here that the concept of strut designates a robust bodywork element which is elongated in a main direction of extension between its ends.

In other words, the chassis is provided with a force distribution means via which an overall thrust force generated by the impact and transmitted to the crossmember by the rail is distributed into at least two elementary thrust forces that are applied against the tube and that comprise the first thrust force and the second thrust force. The force distribution means comprises on the one hand the strut that transmits the second thrust force to the tube, and on the other hand the part of the crossmember extending between the end of the strut secured to the crossmember and the end of the crossmember secured to the tube, by means of which the first thrust force is transmitted to the tube.

This results in the tube being placed under stress by the elementary thrust forces at two stress points which are longitudinally distant by being respectively located at the junction zones to the tube of the ends respectively of the crossmember and of the strut.

The distribution of the application of the overall thrust force against the tube at two longitudinally distant stress points:
- limits the amplitude of the stresses locally borne by the tube and generated respectively by the first thrust force and by the second thrust force,
- provides stabilization of the tube against deformation thereof in its extension part between the two the tube stress points, which ultimately makes it possible to contain a significant deformation of the tube, and/or
- preserves the tube from degradation likely to cause breaking of the securing thereof to the floor, which ultimately reinforces the maintenance of the stiffening of the floor provided by the tube and avoids a significant deformation of the floor liable to compromise the safety of passengers.

According to one specific approach, the chassis comprises a triangulated structure composed of:
- the strut,
- a part of the crossmember extending between its junction zone to the strut and its end joined to the tube, and
- a part of the tube extending between the end of the crossmember by means of which the crossmember is secured to the tube and an end of the strut secured to the tube and which is opposite its other end secured to the crossmember.

According to one embodiment in a plane parallel to the floor, the strut is inclined with respect to the crossmember by a first angle of between 30° and 60° and with respect to the tube by a second angle of between 100° and 130°.

According to one embodiment in a plane parallel to the floor, a single strut is inclined from the crossmember towards the rear of the chassis. However, an embodiment cannot be precluded according to which two struts are distributed on either side of the crossmember.

The particular inclination modalities of the strut which have just been mentioned are in particular chosen in correlation with the application modalities of the side impact against the chassis which were previously mentioned, taking into account the extension dimensions of the strut and the crossmember, as well as the position of the junction zone between the strut and the crossmember.

In particular, a longitudinal thrust component developed towards the rear of the chassis and generated by the overall thrust force applied against the chassis under the effect of the impact is taken into account, so that:
- the strut forms a member for absorbing the energy developed by the longitudinal thrust component, and/or
- the methods of securing and/or arranging the strut at the tube can be easily organized to return the longitudinal thrust component perpendicular to the tube according to the orientation of the second thrust force, which makes it possible to preserve the tube when subject to the longitudinal thrust component.

Thus according to one embodiment, the strut advantageously comprises a member for returning the second thrust force from a first direction of transmission of the second thrust force by the crossmember to the strut which is oriented along the main extension of the strut between the ends thereof, towards a second direction of transmission of the second thrust force by the strut to the tube which is oriented perpendicular to the tube.

According to one embodiment, the return member is formed by an elbow formed at the end of the strut which is secured to the tube. The elbow is oriented perpendicular to the tube in a plane parallel to the floor.

According to one embodiment, the strut comprises at least one reinforcing relief essentially formed along the main extension of the strut between its ends. Such a reinforcing relief is, for example, configured as a rib and/or a boss, originating from the material making up the strut, and is for example formed by stamping or by molding.

According to one embodiment, the strut is in particular configured as a section shaped by stamping.

According to one embodiment, the crossmember is a seat crossmember dedicated to supporting at least one vehicle seat secured to the crossmember. More specifically, the crossmember is a front seat crossmember dedicated to supporting at least one front seat of the vehicle.

DESCRIPTION OF THE FIGURES

One embodiment of the present chassis will be described in relation to the accompanying sets of figures, in which.

DETAILED DESCRIPTION

The figures and the detailed descriptions thereof disclose the invention according to particular modalities which are not restrictive with regard to the scope of the invention as defined by the claims. The figures and their detailed descriptions of one embodiment of the chassis can serve to better define it, if necessary, in relation to the general description which has just been given.

Figure 1:
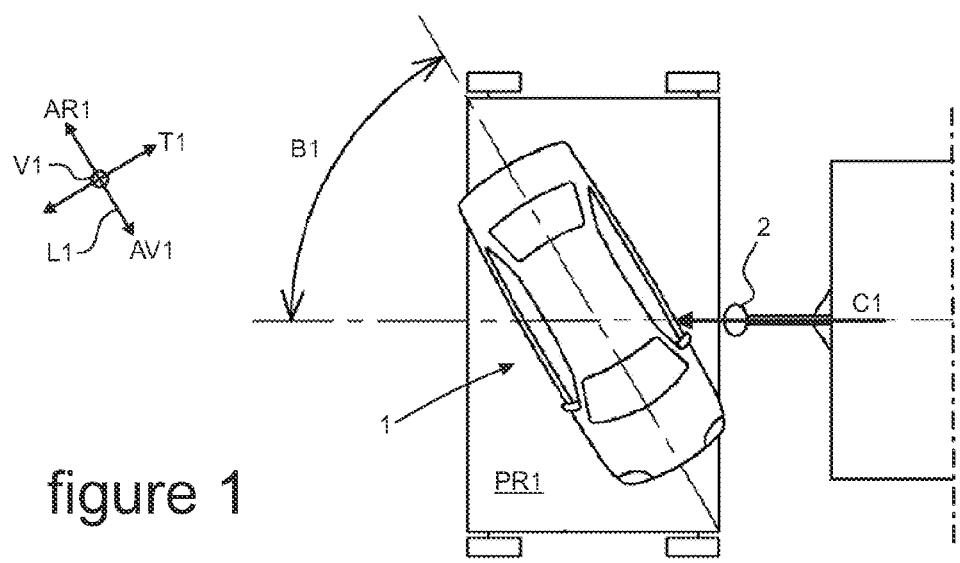
FIG. 1 is an illustration showing, by way of non-limiting example, a context of a side impact against a chassis of a motor vehicle, in which context the new chassis is particularly intended to be applied.

In FIG. 1, a motor vehicle 1 extends in the three directions of an orthonormal coordinate system, typically comprising a longitudinal direction L1 of extension of the vehicle 1 between the rear AR1 and the front AV1 of the vehicle 1, a transverse direction T1 of extension of the vehicle 1 between its lateral sides, and a vertical direction V1 of extension of the vehicle 1 in elevation with respect to its rolling plane PR1 on the ground.

This figure illustrates the application conditions in the test workshop of a side impact C1 against the chassis of the vehicle 1. According to a test protocol, an impact C1 applied by a post 2 against the underbody of the vehicle 1, and therefore against its chassis, is simulated.

The impact C1 is applied against the chassis for a vehicle speed of 32 km/h (~20 mph). The vehicle 1 is oriented in its longitudinal direction L1 at an inclination angle B1 of 75° relative to the direction in which the impact C1 is applied, in a junction zone between a side rail and a crossmember included in the chassis.

Figure 2:
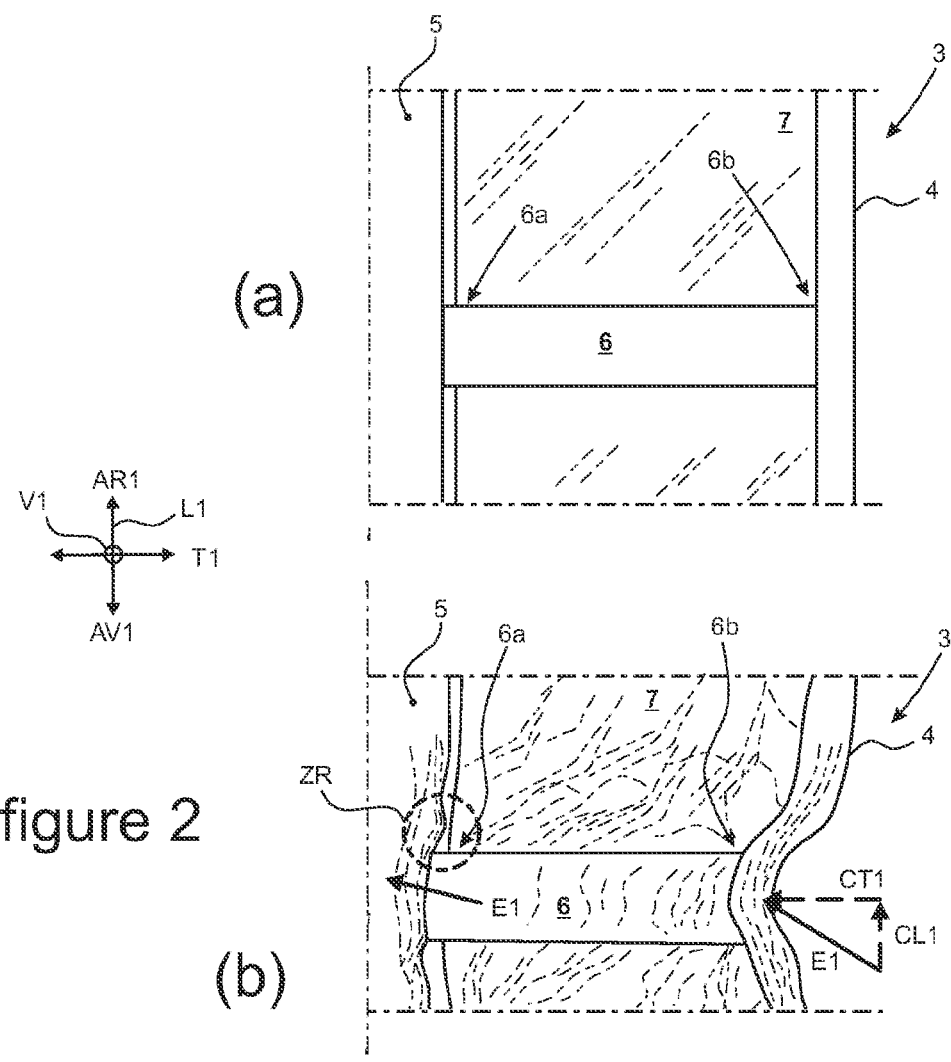
FIG. 2 is composed of two diagrams (a) and (b) illustrating conventional deformation methods of the chassis in the context shown in FIG. 1, it being understood that the new chassis is excluded in the diagrams of this FIG. 2.
Figure 3:
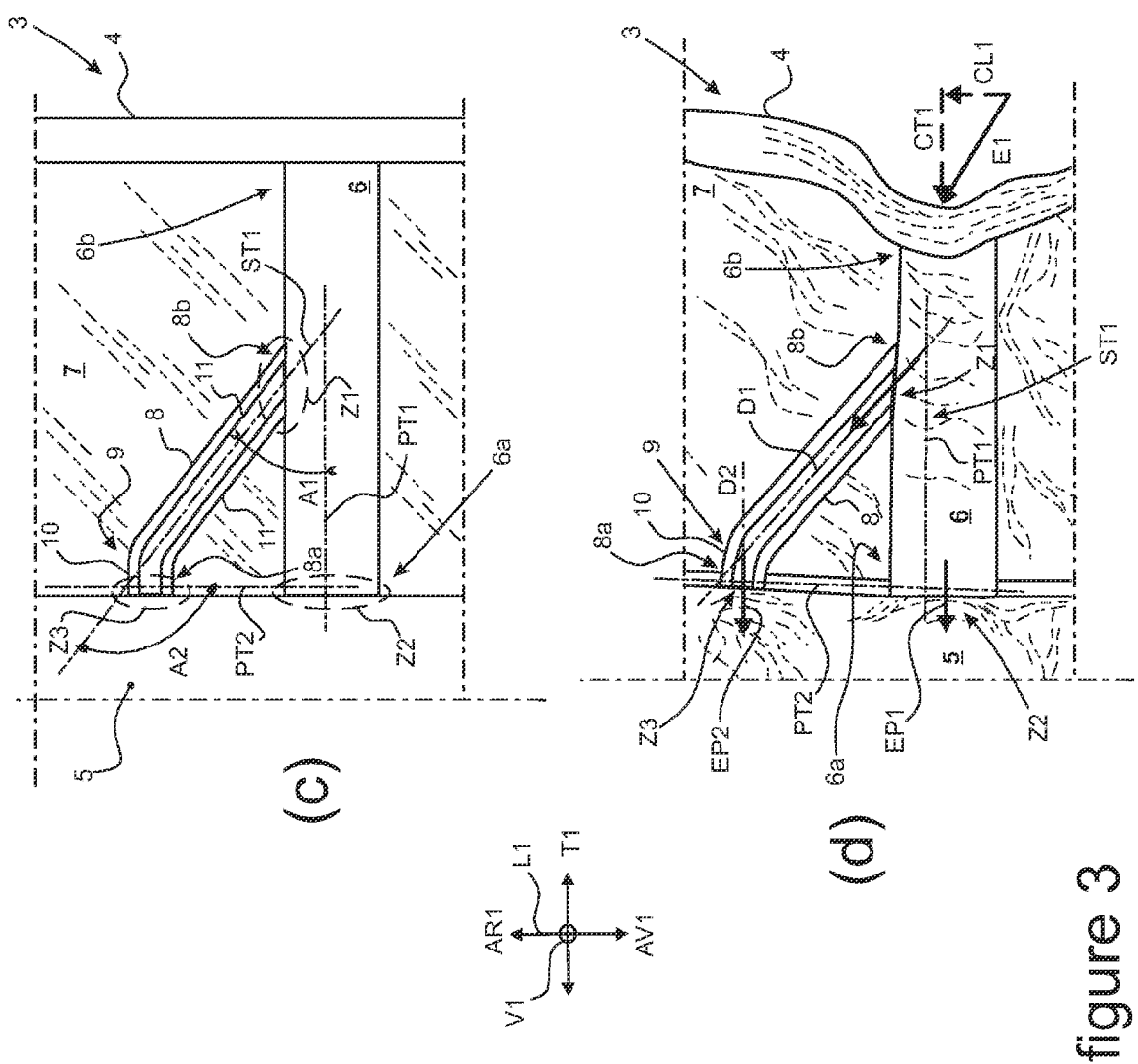
FIG. 3 is composed of two diagrams (c) and (d) illustrating an embodiment of the new chassis, and deformation methods of the vehicle chassis in the context shown in FIG. 1.

In diagrams (a) and (b) of FIG. 2 and in diagrams (c) and (d) of FIG. 3, the chassis 3 of a motor vehicle 1 forms an underbody comprising side rails 4, only one of them being shown in the context illustrated in FIG. 1 of application of the impact C1 against the chassis 3. The chassis 3 also comprises a longitudinal L1 tube 5 placed at a transverse distance T1 from the rail 4. A floor 7, which is generally in the plane L1/T1 and which is oriented parallel to the running plane PR1 of the vehicle and is for example formed from at least one sheet metal panel, is secured to the underbody.

A crossmember 6 extends between, and is connected to, the tube 5 and the rail 4 at the respective ends 6a, 6b of the crossmember. A first end 6a of the crossmember 6 is secured to the tube 5 and a second end 6b of the crossmember 6 is secured to the rail 4. The crossmember 6 is in particular a seat crossmember dedicated to supporting at least one front seat for the front passengers of the vehicle.

In diagrams (b) and (d), the impact C1 applied against the chassis 3 in the context illustrated by FIG. 1 is in particular applied laterally against the side rail 4 in its junction zone with the crossmember 6. The impact C1 then develops an overall thrust force E1 against the rail 4. As a result of the longitudinal inclination of the vehicle 1 relative to the direction in which the impact C1 is applied against the rail 4, the overall thrust force E1 mainly generates a transverse force component CT1, but also a longitudinal force component CL1, or potentially also to a lesser extent a vertical force component.

The overall thrust force E1 then causes deformation of the crossmember 6. In addition, the crossmember 6 transmits the overall thrust force E1 to the tube 5, which deforms, which causes a deformation of the floor 7.

As illustrated in diagram (b) of FIG. 2 relating to the prior art, the tube 5 and the floor 7 deform significantly and there is a risk of breaking of the attachment between the tube 5 and the floor 7. Such breaking tends to occur essentially in a zone ZR located at the rear of the crossmember 6, due, in particular, to the transmission by the crossmember 6 to the tube 5 not only of the transverse force component CT1, but also to a lesser extent of the longitudinal force component CL1.

Figure 4:
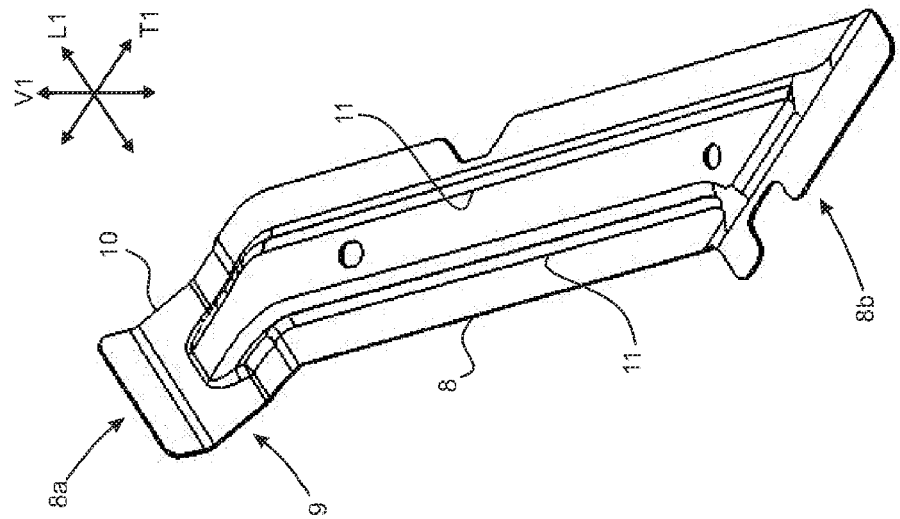
FIG. 4 is a perspective view from above of an embodiment of a strut of the new chassis.

In this context in FIG. 3, in the improved chassis, a strut 8 is interposed between the crossmember 6 and the tube 5. Such a strut 8 is illustrated for example in more detail in FIG. 4. The strut 8 is configured and/or arranged on the chassis 3 by participating with the crossmember 6 of a means for dividing the overall thrust force E1 against the tube 5, into two elementary thrust forces EP1 and EP2.

A first end 8a of the strut 8 is secured to the tube 5 and a second end 8b of the strut 8 is secured to the crossmember 6. Considering a plane parallel to the plane L1/T1 of the floor 7, the strut 8 is inclined towards the rear of the chassis 3 by a first angle A1 with respect to the crossmember 6 and by a second angle A2 with respect to the tube 5.

As an example, the value of the first angle A1 is between 30° and 60° and the value of the second angle A2 is between 100° and 130°. The respective values of the first angle A1 and of the second angle A2 are in particular chosen in correlation with the angle B1 of inclination of the chassis 3 in the context illustrated in FIG. 1, taking into account in particular the extension dimension of the strut 8 and the position of its attachment to the crossmember 6.

It emerges that the chassis 3 comprises a triangulated structure ST1 composed of:
  the strut 8,
  a part PT1 of the crossmember 6 extending between its junction zone Z1 to the strut 8 and its junction zone Z2 to the tube 5, and
  a part PT2 of tube 5 extending between its junction zone Z2 to the crossmember 6 and its junction zone Z3 to the strut 8.

As shown in diagram (d), the triangulated structure ST1 makes it possible to distribute the overall thrust force E1 borne by the crossmember 6 according to the two elementary thrust forces EP1 and EP2. More particularly, the overall thrust force E1 borne by the crossmember 6 is distributed:
  in a first thrust force EP1 applied against the tube 5 by the crossmember 6 along its main extension, and therefore along the transverse direction T1, via the junction zone Z2 between the crossmember 6 and the tube 5, and
  in a second thrust force EP2 applied against the tube 5 by the strut 8 in the transverse direction T1, via the junction zone Z3 between the strut 8 and the tube 5. The second thrust force EP2 comes from the overall thrust force E1 and is transmitted to the strut 8 by the crossmember 6 via their junction zone Z1 to one another.

It emerges that the first thrust force EP1 and the second thrust force EP2 are applied against the tube 5 at two stress points of the tube 5 which are longitudinally distant from one another, being respectively located in the junction zone Z2 between the crossmember 6 and the tube 5 and in the junction zone Z3 between the strut 8 and the tube 5. It emerges that a deformation of the tube 5 is effectively contained when the chassis 3 is subjected to the impact C1, essentially in its part extending between its junction zone Z2 to the crossmember 6 and its junction zone Z3 to the strut 8. Degradation of the tube is thus limited and its attachment to the floor 7 is preserved.

The strut 8 being inclined by the second angle A2 relative to the tube 5, the strut 8 comprises a member 9 for returning the second thrust force EP2 from a first direction D1 of transmission of the second thrust force EP2 by the crossmember 6 to the strut 8, towards a second direction D2 of transmission of the second thrust force EP2 to the tube 5 by the strut 8. The first direction D1 is in particular oriented along the main extension of the strut 8, and the second direction D2 is in particular oriented perpendicular to the tube 5 along its main longitudinal extension L1, and therefore along the transverse direction T1.

According to the illustrated example, the return member 9 is formed by an elbow 10 formed at the first end 8a of the strut 8 by means of which the strut 8 is secured to the tube 5. Such an elbow 10 makes it possible to orient the second thrust force EP2 from the first direction D1 towards the second direction D2.

Furthermore, the strut 8 comprises at least one reinforcing relief 11 formed along its extension and preferably extending towards the elbow 10. The reinforcing relief 11 provides a stiffening of the strut 8 against its deformation under the effect of the application of the second thrust force EP2 to the tube 5 by the strut 8 and/or the transmission by the crossmember 6 of the second thrust force EP2 to the strut 8. The stiffening of the strut 8 by means of the at least one reinforcing relief 11 that it comprises also makes it possible to provide additional reinforcement to the tube 5 against its deformation.

The invention claimed is:

1. A chassis for a motor vehicle, the chassis comprising an underbody frame covered by a floor secured to the frame, the frame comprising:
   side rails,
   at least one longitudinal tube placed at a transverse distance from said rail;
   a crossmember extending between said longitudinal tube and said rail; said crossmember being secured at one end thereof to the tube and at an opposite end thereof to the side rail, the crossmember defining a first member for transmitting to the tube a first thrust force generated by an impact applied laterally against the chassis, and
   at least one strut jointly secured at the respective ends thereof to the crossmember and to the tube, said strut being in a plane parallel to the floor and being inclined with respect to a main direction in which the crossmember and the tube extend, said strut forming a second member for transmitting to the tube a second thrust force generated by said impact and transmitted to the strut by the crossmember.

2. The chassis according to claim 1, wherein the chassis comprises a triangulated structure composed of:
   the strut,
   a part of the crossmember extending between a junction zone of the crossmember to the strut and a junction zone of the crossmember to the tube, and
   a part of the tube extending between the junction zone where the crossmember is secured to the tube and a junction zone wherein a first end of the strut is secured to the tube and which is opposite a second end of the struct which is secured to the crossmember.

3. The chassis according to claim 1, wherein in a plane parallel to the floor, the strut is inclined with respect to the crossmember by a first angle (A1) of between 30° and 60° and with respect to the tube by a second angle (A2) of between 100° and 130°.

4. The chassis according to claim 1, wherein in a plane parallel to the floor, the strut is a single strut and is inclined from the crossmember towards the rear of the chassis.

5. The chassis according to claim 1, wherein the strut comprises a member for returning the second thrust force (EP2) from a first direction of transmission of the second thrust force (EP2) by the crossmember to the strut which is oriented along the main extension of the strut between the ends thereof, towards a second direction of transmission of the second thrust force (EP2) by the strut to the tube which is oriented perpendicular to the tube.

6. The chassis according to claim 5, wherein the return member comprises an elbow formed at the end of the strut which is secured to the tube, the elbow being oriented perpendicular to the tube in a plane parallel to the floor.

7. The chassis according to claim 1, wherein the strut comprises at least one reinforcing relief essentially formed along a main extension of the strut between ends of the strut.

8. The chassis according to claim 1, wherein the strut is shaped by stamping.

9. The chassis according to claim 1, wherein the crossmember is a seat crossmember dedicated to supporting at least one vehicle seat secured to the crossmember.

10. The chassis according to claim 9, wherein the crossmember is a front seat crossmember dedicated to supporting at least one front seat of the vehicle.

* * * * *